United States Patent
Ott

(10) Patent No.: US 12,210,400 B2
(45) Date of Patent: Jan. 28, 2025

(54) TECHNIQUES FOR PERFORMING FAULT TOLERANCE VALIDATION FOR A DATA CENTER

(71) Applicant: Oracle International Corporation, Redwood Shores, CA (US)

(72) Inventor: Jason Matthew Ott, Kingston, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 228 days.

(21) Appl. No.: 18/087,074

(22) Filed: Dec. 22, 2022

(65) Prior Publication Data

US 2024/0211327 A1  Jun. 27, 2024

(51) Int. Cl.
G06F 11/07 (2006.01)
G06F 9/50 (2006.01)

(52) U.S. Cl.
CPC ........ G06F 11/0709 (2013.01); G06F 9/5077 (2013.01)

(58) Field of Classification Search
CPC ............. G06F 11/0709; G06F 11/0772; G06F 11/079; G06F 11/0793
See application file for complete search history.

(56) References Cited

U.S. PATENT DOCUMENTS

| | | | |
|---|---|---|---|
| 10,929,797 B1* | 2/2021 | Gupta | H04L 47/728 |
| 2018/0248758 A1* | 8/2018 | Ali | H04L 41/0677 |
| 2023/0131986 A1* | 4/2023 | Thakkar | G06F 11/3409 |
| | | | 714/37 |

* cited by examiner

*Primary Examiner* — Shelly A Chase
(74) *Attorney, Agent, or Firm* — Kilpatrick Townsend & Stockton LLP

(57) ABSTRACT

Techniques are described for deploying a fault tolerant data center by determining that the physical infrastructure deployment of the data center meets the fault tolerance levels and the fault domains specified for the data center. Techniques are described for obtaining configuration information related to various infrastructure resources deployed in a data center. A resource graph for the data center is generated based on the configuration information. The resource graph represents a logical representation of a set of vertices representing the physical and logical resources used to power a data center and a set of edges that connect the set of vertices. The resource graph is used to determine if a set of infrastructure nodes deployed in the data center meet the fault tolerance levels and fault domains specified for the data center. Results indicative of whether a deployed data center is fault tolerant are then transmitted to a user.

20 Claims, 13 Drawing Sheets

TECHNIQUES FOR PERFORMING FAULT TOLERANCE VALIDATION FOR A DATA CENTER

BACKGROUND

A data center is a physical facility that is composed of infrastructure and storage resources used to provide a set of services for an organization. Building a new data center can be a complex activity requiring coordination between various teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Due to this complexity, presently, the building of a data center in a region involves several manually initiated or manually controlled tasks that require careful manual coordination. Additionally, the process is very error prone, sometimes requiring several iterations before a desired configuration of the data center is achieved, which further adds to the time taken to build a data center.

For instance, an error while setting up a data center may result in the incorrect placement of a cable, or an incorrect configuration applied to a switch during deployment. While data center deployments typically operate in a normative state, when data partitioning arises during the operation of the data center, the data center may not meet its guarantees with respect to fault tolerance. Fault tolerance of a data center refers to the capability of a data center to continue operating without interruption even when one or more of its components fail. For instance, if a network cable or power cable is not plugged into the correct port/outlet it may conflate two or more of the data center's fault domains resulting in a data center that is not fault tolerant. A fault domain in a data center may represent a group of hardware and infrastructure resources within the data center that is vulnerable to damage if a device or component within the group fails.

The management of a data center and its fault domains typically requires a high degree of coordination between various teams within an organization to achieve a desired configuration and desired fault tolerance for the data center. There is thus a need for making the process of building fault tolerant data centers, more efficient than is possible in existing implementations.

BRIEF SUMMARY

The present disclosure generally relates to deploying fault tolerant data centers. More particularly, techniques are described for determining that the physical infrastructure deployment of a data center meets the fault tolerance levels and the fault domains specified for the data center.

In certain embodiments, a data center fault tolerance determination system is disclosed. The system receives configuration information associated with a data center and constructs a resource graph for the data center based on the configuration information. The resource graph comprises a set of nodes representing a set of infrastructure resources deployed in the data center and a set of edges representing a set of connections between the set of infrastructure resources deployed in the data center. For each node in the set of nodes in the resource graph, the system then determines whether the node representing an infrastructure resource deployed in the data center is fault tolerant. In accordance with the determination that the node is fault tolerant, the system transmits a notification that indicates that the node representing the infrastructure resource in the data center is fault tolerant.

In some examples, the system computes a set of one or more unique paths connecting the node from a source node to a sink node in the resource graph and based on the set of unique paths computed for the node, determines that the node is fault tolerant with respect to fault tolerance levels specified for the data center. In some examples, the system determines that the set of one or more unique paths computed for the node is at least equal to or greater than a number of fault domains specified for the data center and based on determining that that the set of unique paths computed for the node is equal to or greater than the number of fault domains specified for the data center, the system determines that the node is fault tolerant with respect to both the fault tolerance levels and the number of fault domains specified for the data center.

In certain examples, the notification transmitted by the system indicates that the node representing the infrastructure resource in the data center is fault tolerant with respect to both the fault tolerance levels and the number of fault domains specified for the data center.

In certain examples, the system determines that the node representing the infrastructure resource deployed in the data center is not fault tolerant with respect to fault tolerance levels specified for the data center and responsive to the determining, the system transmits a notification that indicates that the node representing the infrastructure resource in the data center is not fault tolerant with respect to the fault tolerance levels specified for the data center.

In certain examples, the configuration information identifies the set of infrastructure resources deployed in the data center and the set of connections between the set of infrastructure resources. In certain examples, the set of infrastructure resources deployed in the data center comprise servers, racks, switches, power supplies, and routers deployed in the data center.

In certain examples, the set of edges in the resource graph represent a set of network edges identifying a set of network connections between the set of infrastructure resources in the data center and a set of power edges identifying a set of power connections between the set of infrastructure resources in the data center.

In certain examples, the system constructs a network resource graph for the data center based on the configuration information. The network resource graph comprises the set of infrastructure resources deployed in the data center where a set of edges in the network resource graph represent a set of network connections between the set of infrastructure resources In certain examples, the system constructs a power resource graph for the data center based on the configuration information. The power resource graph comprises the set of infrastructure resources where a set of edges in the power resource graph represent a set of power connections between the set of infrastructure resources.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
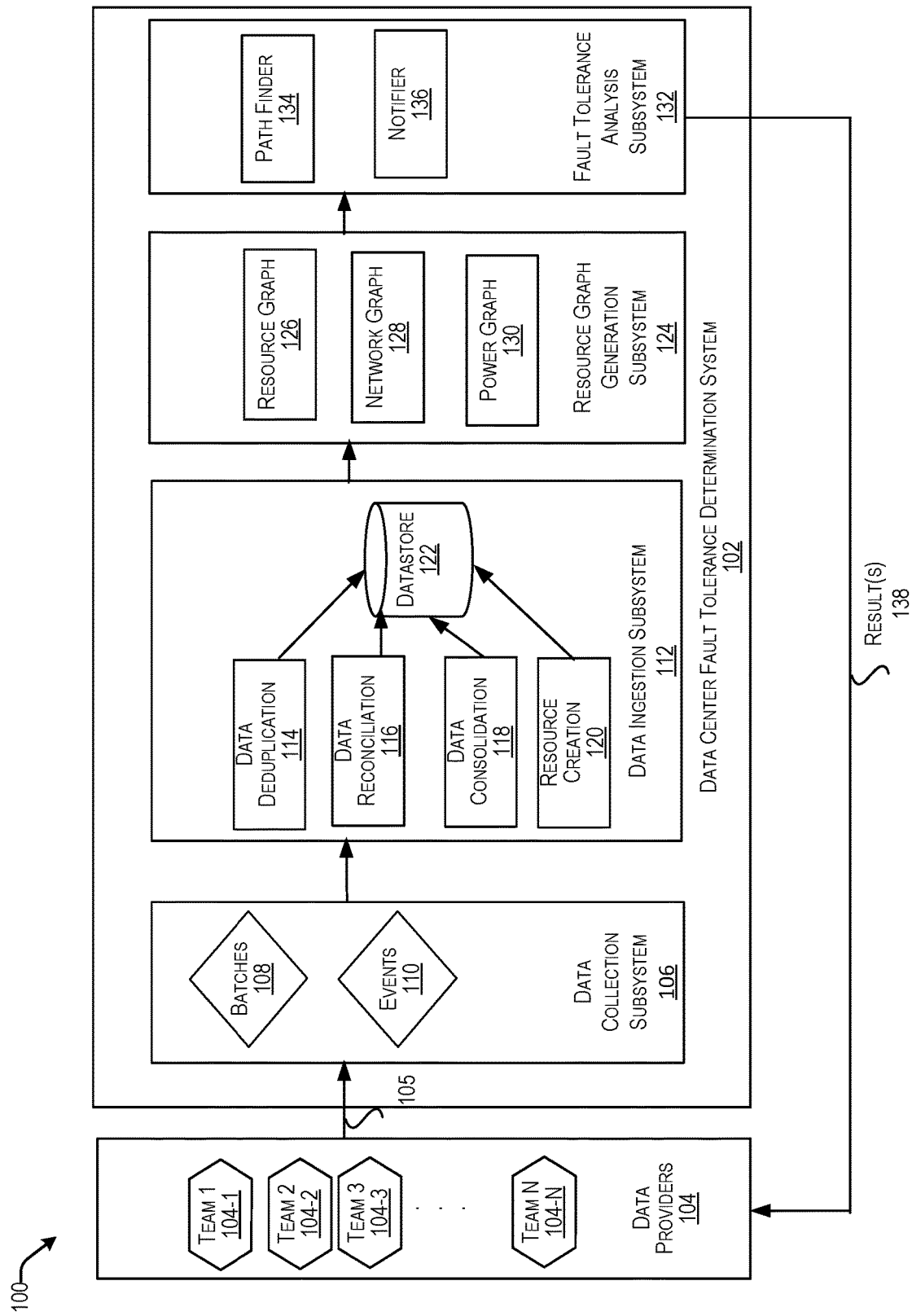
FIG. 1 depicts an example computing environment comprising a data center fault tolerance determination system that is configured to determine if a data center that is deployed is fault tolerant, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "example" is used herein to mean "serving as an example, instance, or illustration." Any embodiment or design described herein as "exemplary" is not necessarily to be construed as preferred or advantageous over other embodiments or designs.

The present disclosure generally relates to deploying fault tolerant data centers. More particularly, techniques are described for determining that the physical infrastructure deployment of a data center meets the fault tolerance levels and the fault domains specified for the data center.

The availability and reliability of a data center may be enhanced by configuring the data center with fault tolerance capabilities. As previously noted, fault tolerance of a data center refers to the capability of a data center to continue operating without interruption even when one or more of its components fail. A fault domain may represent a group of hardware and infrastructure resources within the data center that is vulnerable to damage if a device or component within the group fails. For example, a fault domain may be a physical rack in the datacenter, a node (server) in the data center, a chassis (a cluster of hardware) in the data center, or an entire datacenter, i.e., the physical site (the physical geolocation of hardware consisting of racks, power units and network gateways) in the data center. For instance, for a data center to be rack fault-tolerant, the data center ideally should have multiple racks and the nodes (servers) of the rack should be distributed across the multiple racks.

In certain embodiments, techniques are described for determining whether infrastructure resources deployed in a data center are fault tolerant with respect to fault tolerance levels and fault domains specified for the data center. A data center fault tolerance determination system is described. In some examples, the system obtains configuration information related to various infrastructure resources (e.g., servers, networks, racks, switches, routers, power distribution units (PDUs) and the like) deployed in a data center from various data sources and generates a resource graph for the data center based on the configuration information. The resource graph may represent a logical representation, in graph form, of a set of vertices (also referred to herein as nodes) that represent the physical, virtual, and logical resources such as hosts, PDUs, switches, network cards, routers, and the like used to power a data center and a set of edges (e.g., network edges, power edges) that connect the vertices. The system can then analyze the resource graph to determine if a set of infrastructure nodes deployed in the data center meet the fault tolerance levels and fault domains specified for the data center. The system can then transmit results indicative of whether a deployed data center is fault tolerant. In certain embodiments, the results may include a notification determined by the system as to whether an infrastructure resource deployed in the data center is fault tolerant with respect to the fault tolerant levels and/or the fault domains specified for the data center, and possibly other information related to the infrastructure resource included in the results. By determining that a deployed data center or one that is in the process of being deployed is fault tolerant, the technique disclosed herein facilitates the correctness of infrastructure planning and implementation of the data center. This, in turn, enables customers utilizing the services of the data center to be confident that the physical infrastructure deployment of their data center is robust and resilient.

Referring now to the drawings, FIG. 1 depicts an example computing environment 100 comprising a data center fault tolerance determination system that is configured to determine if a data center that is deployed is fault tolerant, according to certain embodiments. In the embodiment depicted in FIG. 1, the system 102 includes several systems and subsystems including a data collection subsystem 106, a data ingestion subsystem 112, a resource graph generation subsystem 124 and a fault tolerance analysis subsystem 132. The systems and subsystems depicted in FIG. 1 may be implemented using only software (e.g., code, instructions, program) executed by one or more processing units (e.g., processors, cores), only hardware, or combinations thereof.

The software may be stored on a non-transitory storage medium (e.g., on a memory device). Portions of data or information used by or generated by the system 102 as part of its processing may be stored in a persistent memory store, such as datastore 122.

The computing environment 100 depicted in FIG. 1 is merely an example and is not intended to limit the scope of claimed embodiments. One of ordinary skill in the art would recognize many possible variations, alternatives, and modifications. For example, in some implementations, the system 102 can be implemented using more or fewer subsystems than those shown in FIG. 1, may combine two or more subsystems, or may have a different configuration or arrangement of subsystems.

The system 102 may be implemented in various different configurations. In certain embodiments, the system 102 may be provided as a fault tolerance determination system within an enterprise (organization) servicing users of the enterprise. For instance, users of an enterprise may utilize the functionality of the system 102 to determine if a data center deployed/hosted by the enterprise is fault tolerant. In some other embodiments, the system 102 may be implemented on one or more servers of a cloud service provider (CSP) and its fault tolerance determination functionality may be provided to subscribers (e.g., an organization or an enterprise) who subscribe to cloud services on a subscription basis. For instance, the CSP may build or deploy a data center to provide cloud services to its subscribing customers and be responsible for equipping the data center with infrastructure and resources that are used to provide that particular set of cloud services. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources.

Figure 2:
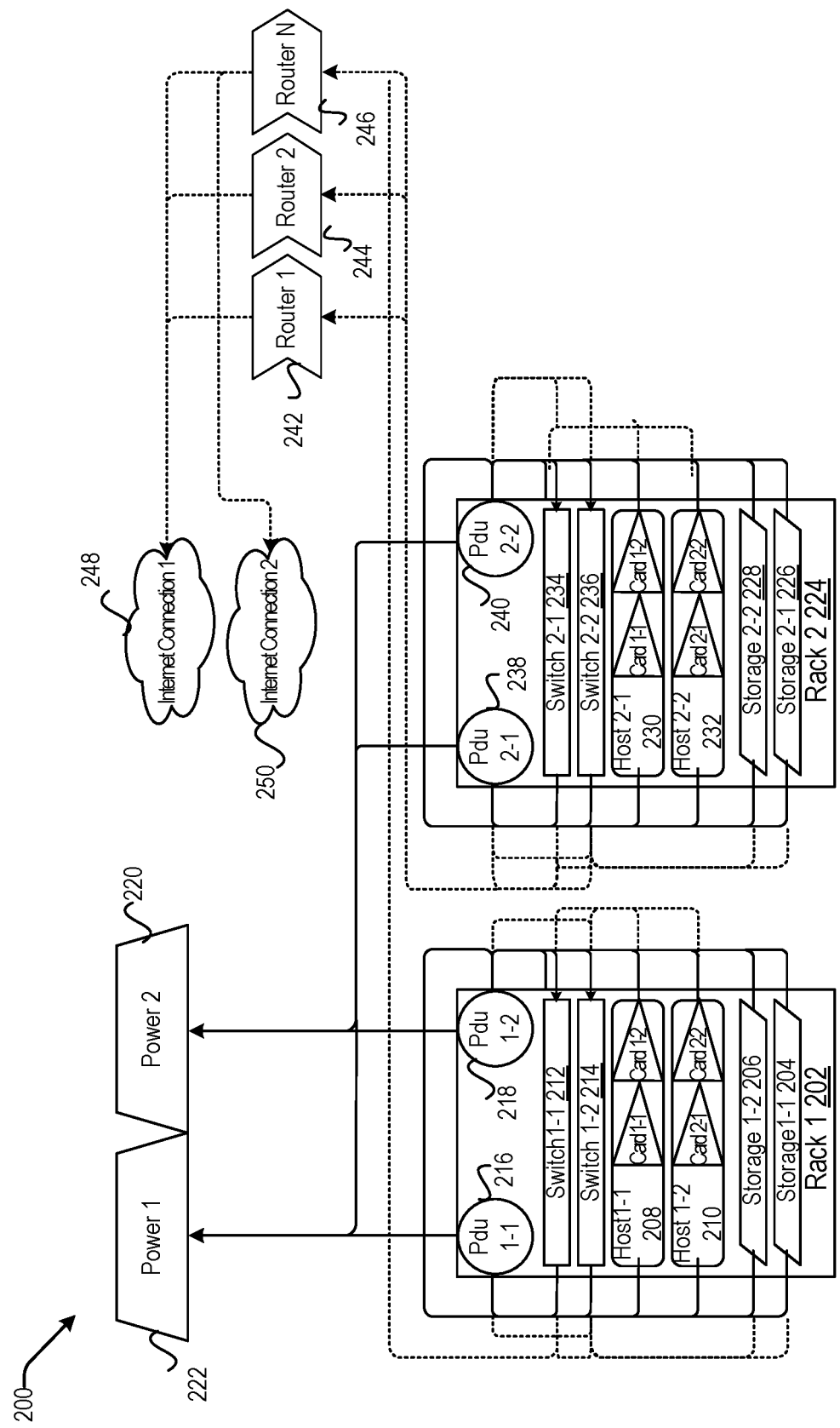
FIG. 2 is an exemplary illustration of a physical infrastructure of a data center deployed by an organization, according to certain embodiments.

As depicted in FIG. 1, various data providers 104 may interact with the system 102 using user devices that are communicatively coupled to the system 102, possibly via one or more communication networks. The user devices may be of various types, including but not limited to, a mobile phone, a tablet, a desktop computer, and the like. The data providers 104 may represent various service teams (e.g., team 1 104-1, team 2 104-2, team 3 104-3 . . . team N 104-N) within an organization that interact with the system 134 to provide configuration information 105 associated with infrastructure resources in a data center deployed in the organization. An exemplary illustration of a data center deployed by an organization is shown in FIG. 2. The configuration information 105 may include information identifying the various infrastructure resources (e.g., servers, networks, racks, switches, routers and the like) in the data center and information identifying the connections between the various resources in the data center. The configuration information may then be communicated from the various teams (for e.g., via their user devices) to the system 102 for analysis.

Upon receiving the configuration information for a data center from the various service teams, the system 102 then processes the configuration information to determine if the physical infrastructure deployment of a data center matches the fault tolerance levels and fault domains specified for the data center. The results 138 of the processing performed by the system are then communicated back to the various service teams. These results 138 may include a notification determined by the system as to whether an infrastructure resource deployed in the data center is fault tolerant with respect to the fault tolerant levels and/or the fault domains specified for the data center, and possibly other information related to the infrastructure resource included in the results. The results may be output to the service teams via a UI of the user devices. Details related to the processing performed by the various systems and subsystems in FIG. 1 are described below with respect to the flowchart depicted in FIG. 3 and its accompanying description.

FIG. 2 is an exemplary illustration of a physical infrastructure of a data center deployed by an organization, according to certain embodiments. In the illustrated embodiment, the data center 200 is composed of two server racks, rack 1 202 and rack 2 224. Each server rack (202, 2224) supports various data center components such as storage systems, hosts, network cards, switches, routers, and power distribution units (PDUs). The PDUs are devices used for controlling electrical power in the data center. For instance, in the embodiment depicted in FIG. 2, rack 1 202 is composed of storage systems 206, 204 and hosts 208, 210. Each host (e.g., 208 and 210) is composed of one or more networks cards card-1-1, card 1-2, card 2-1 and card 2-2. Rack 1 202 additionally comprises switches 212 and 214 and PDUs 216 and 218. PDU 1-1 216 is connected to power supply, power 1 222 and PDU 1-2 218 is connected to power supply, power 2 220. Similarly, rack 2 224 in the data center 200 is composed of storage systems 226, 228 and hosts 230, 232. Each host (e.g., 230 and 232) is composed of one or more networks cards. Rack 2 224 additionally comprises switches 234 and 236 and PDUs 238 and 240. PDU 238 is connected to power supply, power 1 222 and PDU 240 is connected to power supply, power 2 220. Each of the server racks (202, 224) are connected to one or more routers (router-1 242, router-2 244, and router-3 246). The server racks (202, 224) additionally have internet connectivity to internet connection 1 248 and internet connection 2 250.

In the illustrated data center 200, the network connectivity between the nodes of the data center (e.g., the physical and network-based devices and equipment such as the racks, servers, hosts, network cards, switches, PDUs, routers and so on) within the data center are shown in dotted lines whereas the power connectivity between the data center nodes is shown in solid lines. It should be appreciated that various different configurations for a data center set up are possible, which may be different from the illustrated data center set up shown in FIG. 2. The embodiment shown in FIG. 2 is thus one example of a configuration (set up) for a data center for implementing an embodiment of the system 102 and is not intended to be limiting.

In certain examples, the system 102 shown in FIG. 1 receives configuration information associated with a data center (e.g., 200) from various service teams (team-1, team-2 . . . team-N) within an organization. The system then processes and analyses the configuration information to determine if the physical infrastructure deployment of the data center matches the fault tolerance levels and fault domains specified in a deployment specification associated with the data center. As an example, configuration information provided by a service team (e.g., team 1) for the data center deployment 200 may include information identifying that a particular network card 1-1 is hosted in server rack 1 202 at a particular elevation 5 and in a particular slot 3. In another example, the configuration information provided by a different service team (e.g., team 2) may include information identifying that a switch 2 214 is in rack 1 202 at elevation 14 and so on.

Figure 3:
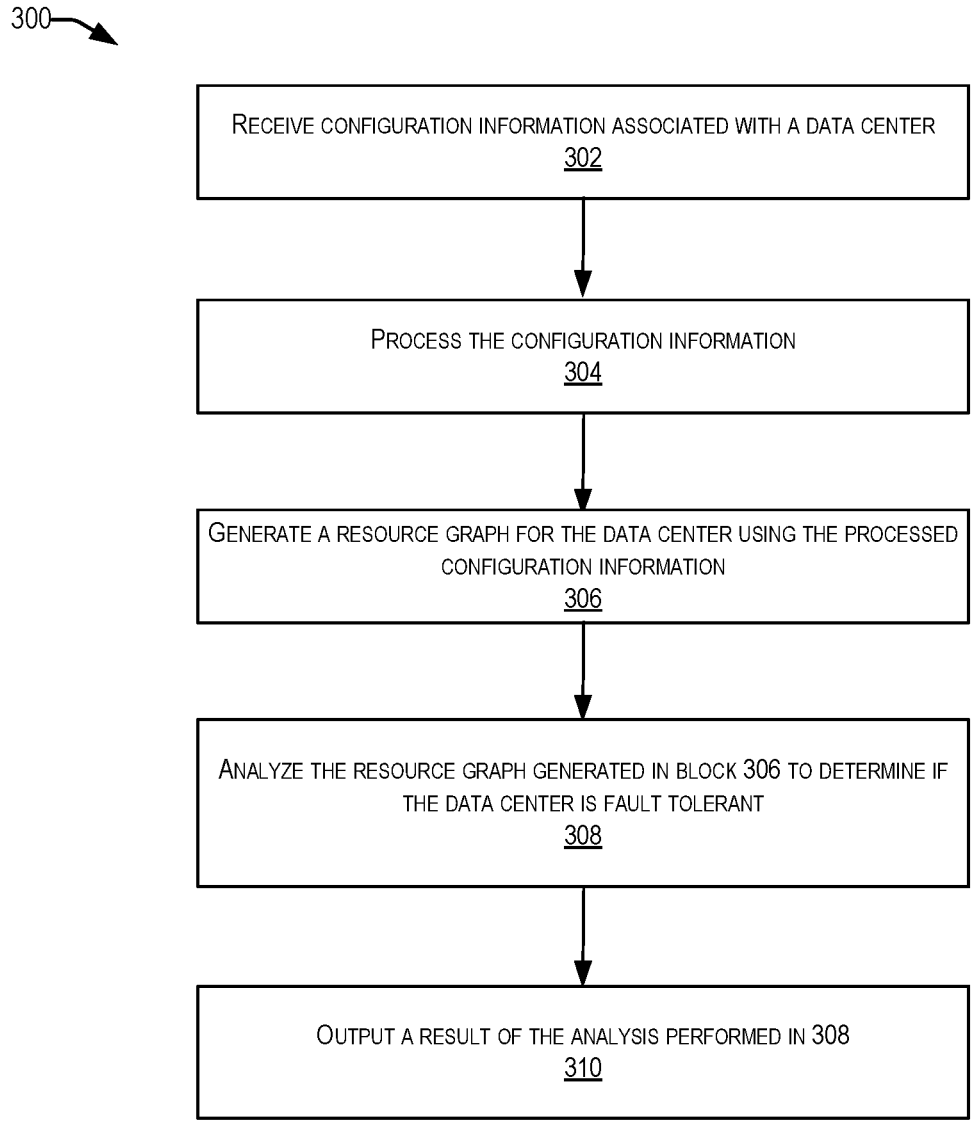
FIG. 3 depicts an example of the processing performed by the system shown in FIG. 1 for determining if a data center that is deployed is fault tolerant, according to certain embodiments.

FIG. 3 depicts an example of the processing performed by the system shown in FIG. 1 for determining if a data center that is deployed is fault tolerant, according to certain embodiments. The processing depicted in FIG. 3 may be implemented in software only (e.g., code, instructions, program) executed by one or more processing units (e.g., processors, cores) of the respective systems, hardware only, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by the various subsystems (e.g., the data collection subsystem 106, the data ingestion subsystem 112, the resource graph generation subsystem 124 and the fault tolerance analysis subsystem 132) of system 102.

In the embodiment depicted in FIG. 3, processing may be triggered when the data collection subsystem 106 receives configuration information associated with a data center. As previously described, the configuration information may include information identifying the various infrastructure resources (e.g., servers, networks, racks, switches, routers, PDUs and the like) in the data center and information identifying the connections between the various resources in the data center. In certain examples, the configuration information may be provided by various service teams (e.g., team-1, team-2, team-3 . . . team N) within an organization that interact with the system 102 using various user devices that are communicatively coupled to the system 102.

Each service team (e.g., team-1, team-2, team-3 . . . team N) may be responsible for providing configuration information (e.g., 105) related to different services (or resources) deployed in the data center. By way of example, service team-1 104-1 may provide configuration information identifying computing resources such as hosts, virtual machines, containers, applications, processors in the data center. Service team-2 104-2 may provide configuration information identifying network connectivity information for a site or a rack hosted by the data center. By way of example, the network connectivity information may identify that a particular network card is placed on a particular rack in the data center. For instance, referring to the example of the data center 200 shown in FIG. 2, configuration information provided by a service team-2 104-2 may include information identifying that a particular network card 1-1 is hosted in server rack 1 202 at a particular elevation 5 and in a particular slot 3 or that a switch 2 214 is in rack 1 202 at elevation 14. Service team-3 may provide configuration information related to clusters of hardware hosted in the data center. Service team-4 may be responsible for providing configuration information relating to audit logs related to various resources provisioned in the data center. For instance, service team-4 may identify that a particular instance (a virtual machine) deployed in the data center is being re-booted.

In certain examples, the configuration information 105 may be provided in the form of a configuration file. In other examples, the data center configuration information may also be provided in the form of data logs or a deployment schema that includes information identifying the various components of the data center and the connections between the components.

At block 304, the configuration information is ingested and processed by the data ingestion subsystem 106. In certain examples, the configuration information may be ingested as batches 106 or as individual event data 110 by the data ingestion subsystem 106. The data processing subsystem may then apply various data processing techniques to process the configuration information. These data processing techniques may include, but are not limited to, performing data transformations on the data, performing data deduplication procedures to verify that the data has not been seen before, performing data reconciliation to identify what the data describes, performing data consolidation to aggregate like-data together, applying resource creation techniques to flatten all consolidated data together to produce a composite view of a resource and the like. In certain examples, the processed configuration information for the data center may be stored in a datastore 122 that is communicatively connected to the data ingestion subsystem 112.

At block 306, the resource graph generation subsystem 124 generates/constructs a resource graph for the data center using the (processed) configuration information received from the data ingestion subsystem. The resource graph represents a logical representation, in graph form, of a set of vertices (also referred to herein as nodes) that represent the physical, virtual, and logical infrastructure resources such as hosts, PDUs, switches, network cards, routers, and the like used to power a data center and a set of edges (e.g., network edges, power edges) that identify a set of connections between the set of infrastructure resources. Additional details of the processing performed by the resource graph generation subsystem 124 to generate a resource graph is described in FIG. 4. In certain implementations, the resource graph generation subsystem 124 may be configured to generate various types of resource graphs (e.g., 126, 128 and 130) for a data center. Details related to the implementation of the various types of resource graphs by the resource graph generation subsystem is described below in FIG. 5, FIG. 6, and FIG. 7.

At 308, the fault tolerance analysis subsystem 132 analyzes the resource graph generated by the resource graph generation subsystem 124 to determine if the data center that is deployed is fault tolerant. In a certain implementation, the resource graph generation subsystem 124 may be configured to analyze a set of nodes (that represent infrastructure resources deployed in the data center) in the resource graph and based on the analysis, determine if the physical infrastructure deployment of the data center matches the fault tolerance levels and fault domains specified for the data center. Additional details of the processing performed by the fault tolerance analysis subsystem 132 is described in FIG. 8.

At block 310, the fault tolerance analysis subsystem 138 transmits results to a user. The results 124 of the processing performed by fault tolerance analysis subsystem 138 are then communicated back to a requesting user or service team within an organization (e.g., team-1, team-2, team-3 . . . team N). These results 138 may include a notification determined by the fault tolerance analysis subsystem 132 as to whether an infrastructure resource deployed in the data center is fault tolerant with respect to the fault tolerant levels and/or the fault domains specified for the data center, and possibly other information related to the infrastructure resource included in the results. The results 138 may be output to the requesting user via a UI of the user's device.

Figure 4:
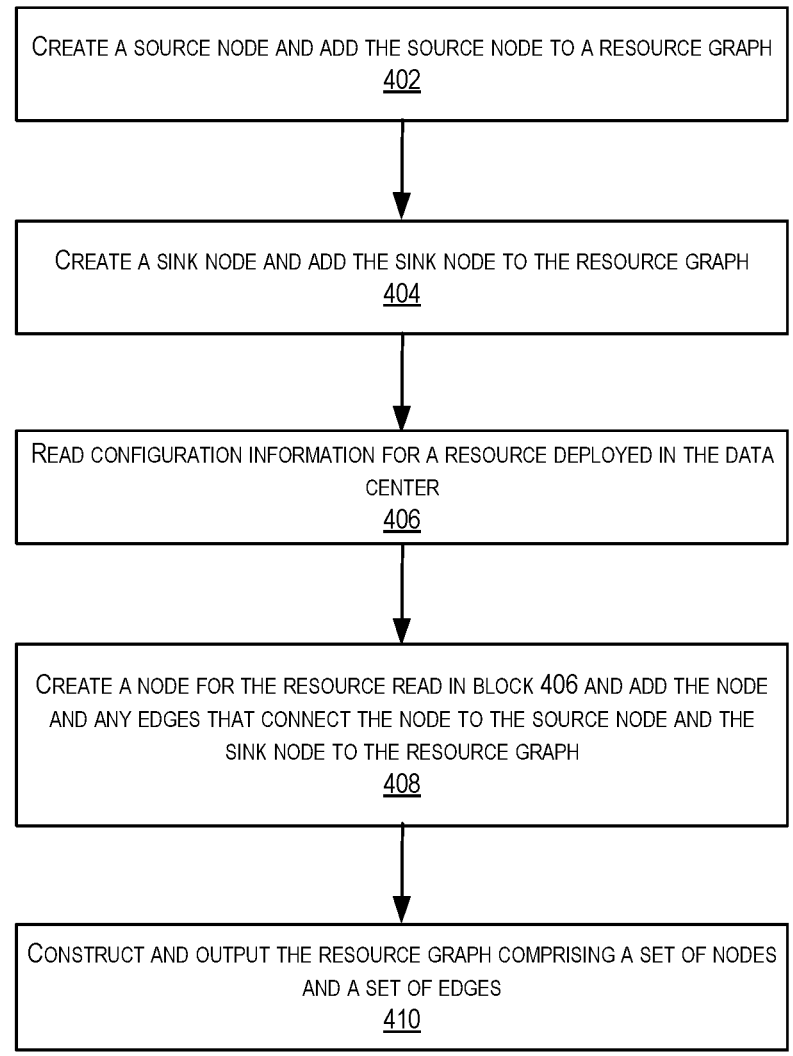
FIG. 4 depicts an example of a process for building a resource graph according to certain embodiments.

FIG. 4 depicts an example of a process 400 for building a resource graph according to certain embodiments. The processing depicted in FIG. 4 may be implemented in software only (e.g., code, instructions, program) executed by one or more processing units (e.g., processors, cores) of the respective systems, hardware only, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by the resource graph generation subsystem 124 of system 102.

In the embodiment depicted in FIG. 4, processing can be triggered in block 402 when the resource graph generation subsystem 124 creates a source node and adds the source node to a resource graph. As used herein, a source node is a node (also known as a vertex) with no incoming connections (e.g., edges) from other nodes.

In block 404, the resource graph generation subsystem 124 creates a sink node and adds the sink node to the resource graph. As used herein, a sink node is a node (also referred to herein as a vertex) with no outgoing connections to other nodes.

For the processing described in blocks 402 and 404, it is assumed that the resource graph generation subsystem 124 builds a resource graph from scratch (e.g., the graph is empty to start out with). In embodiments, where a resource graph has previously been built, a check may be first made in block 402 and block 404 to see if a source node or a sink node already exists in the resource graph, and the source node and/or the sink node is added only if the resource graph does not already contain a source node and/or a sink node.

In block 406, the resource graph generation subsystem 124 reads configuration information (which may be processed by the data ingestion subsystem) for an infrastructure resource deployed in the data center. As previously described, the configuration information for an infrastructure resource may include information identifying the resource (e.g., a host machine, a server, a network card, a switch, a router, a PDU, a rack, a chassis and like) and information identifying the connections between the resource to other resources deployed in the data center.

At block 408, the resource graph generation subsystem 124 creates a node (vertex) for the resource identified in the configuration information read for the resource in block 406 and adds the node to a resource graph. If the node has no incoming edge, the graph generation subsystem 124 adds an edge (connection) between the source node and the particular node. Similarly, if the node has no outgoing edges, the graph generation subsystem 124 adds an edge (connection) between the sink node and the particular node. Additionally, in this block, the resource graph generation subsystem 124 may add edges from the node to other nodes in the graph based on the connectivity information identified for the resource from the configuration information.

For the processing depicted in block 408, where a resource graph has previously been built or has been partially built, a check may be first made to see if a node already exists for the resource in the graph, and the node is added only if the resource graph does not already contain the resource read in block 406.

The process depicted in blocks 406-408 is repeated for all the infrastructure resources deployed in the data center. If it is determined that all the resources received as part of the configuration information have been processed, in block 410, the resource graph generation subsystem 124 constructs and outputs a resource graph comprising a set of nodes representing the infrastructure resources deployed in the data center and a set of edges representing the connections between the infrastructure resources.

The resource graph generation subsystem 124 may be configured to generate various types of resource graphs that represent a set of infrastructure resources deployed in the data center and the connections between the infrastructure resources, such as, for instance, a resource graph, a network resource graph and a power resource graph. Additional details of the implementations of the various types of resource graphs generated by the resource graph generation subsystem 124 are described in detail in FIGS. 5-7 below.

Figure 5:
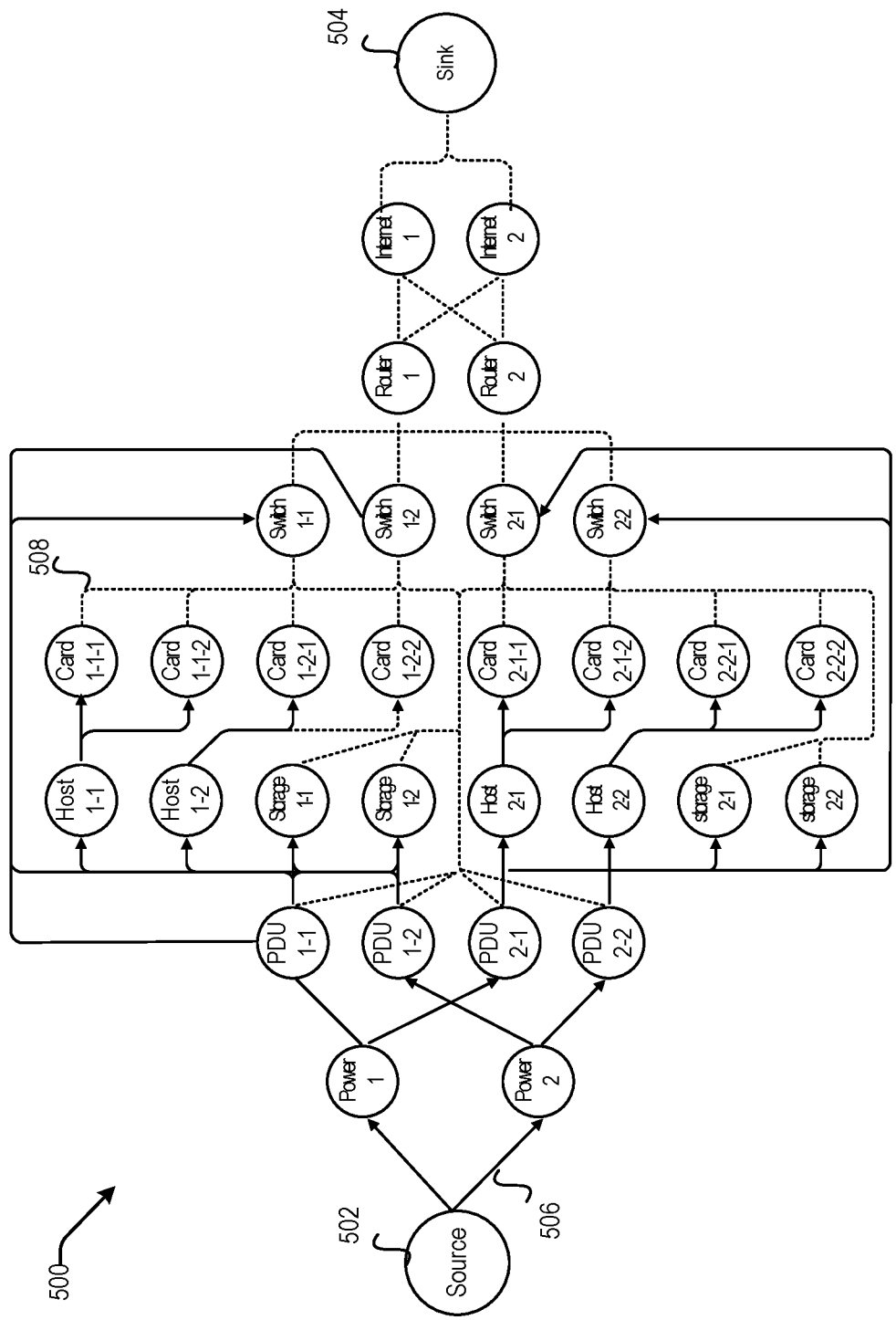
FIG. 5 is an illustration of a resource graph representing a data center, in accordance with certain embodiments.

FIG. 5 is an illustration of a resource graph 500 representing a data center, in accordance with certain embodiments. In a certain implementation, the graph generation subsystem 124 generates a resource graph 500 based on configuration information associated with a data center (e.g., 200 as shown FIG. 2). The resource graph 500 is a logical representation, in graph form, of a set of infrastructure resources (e.g., power supplies, PDUs, hosts, network cards, switches and routers) deployed in the data center and a set of edges representing the connections between the infrastructure resources. The set of edges include both network edges that represent the network connections in the data center as well as power edges that represent the power connections in the data center. As further illustrated in FIG. 5, the resource graph 500 additionally includes a source node 502 and a sink node 504 which are created and added by the graph generation subsystem 124 during the process of graph generation as described in FIG. 4. In the illustrated embodiment, the network connectivity between the data center nodes is shown in dotted lines (e.g., 508) while the power connectivity (e.g., 506) between the data center nodes is shown in solid lines.

Figure 6:
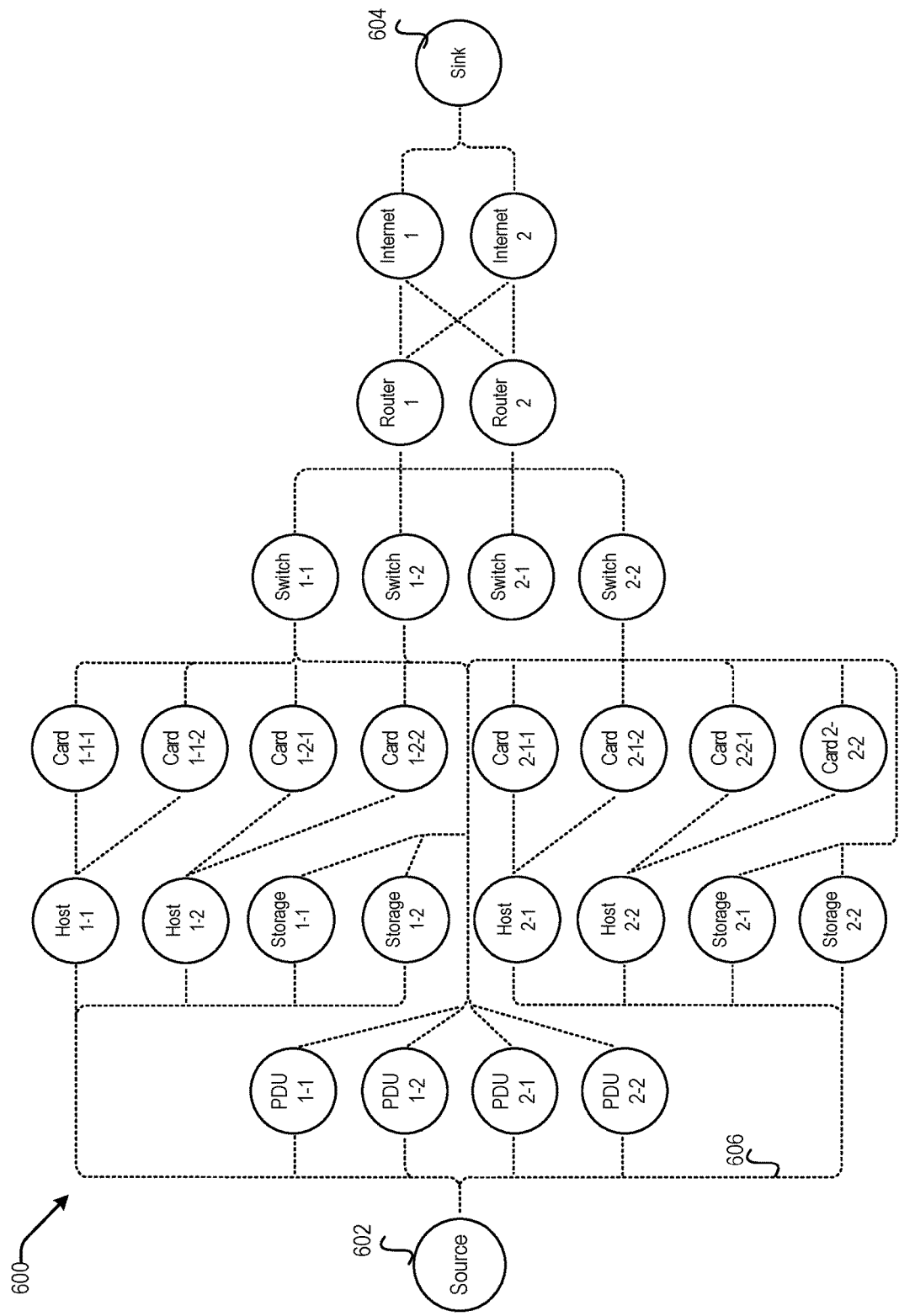
FIG. 6 is an illustration of a network resource graph representing a data center, in accordance with certain embodiments.

FIG. 6 is an illustration of a network resource graph 600 representing a data center, in accordance with certain embodiments. In a certain implementation, the graph generation subsystem 124 generates a network resource graph 600 based on configuration information associated with a data center (e.g., the data center set up 200 as shown FIG. 2). The network resource graph 600 is a logical representation, in graph form, of a set of infrastructure resources (e.g., power supplies, PDUs, hosts, network cards, switches and routers) deployed in the data center and a set of edges representing the network connections between the infrastructure resources. In contrast to the resource graph 500 shown in FIG. 5, the set of edges in the network resource graph 600 comprise only set of network edges representing a set of network connections within the data center. As further illustrated in FIG. 6, the network resource graph 600 additionally includes a source node 602 and a sink node 604 which are created and added by the graph generation subsystem 124 during the process of graph generation as described in FIG. 4. In the illustrated embodiment, the network connectivity between the data center nodes is shown in dotted lines (e.g., 606).

Figure 7:
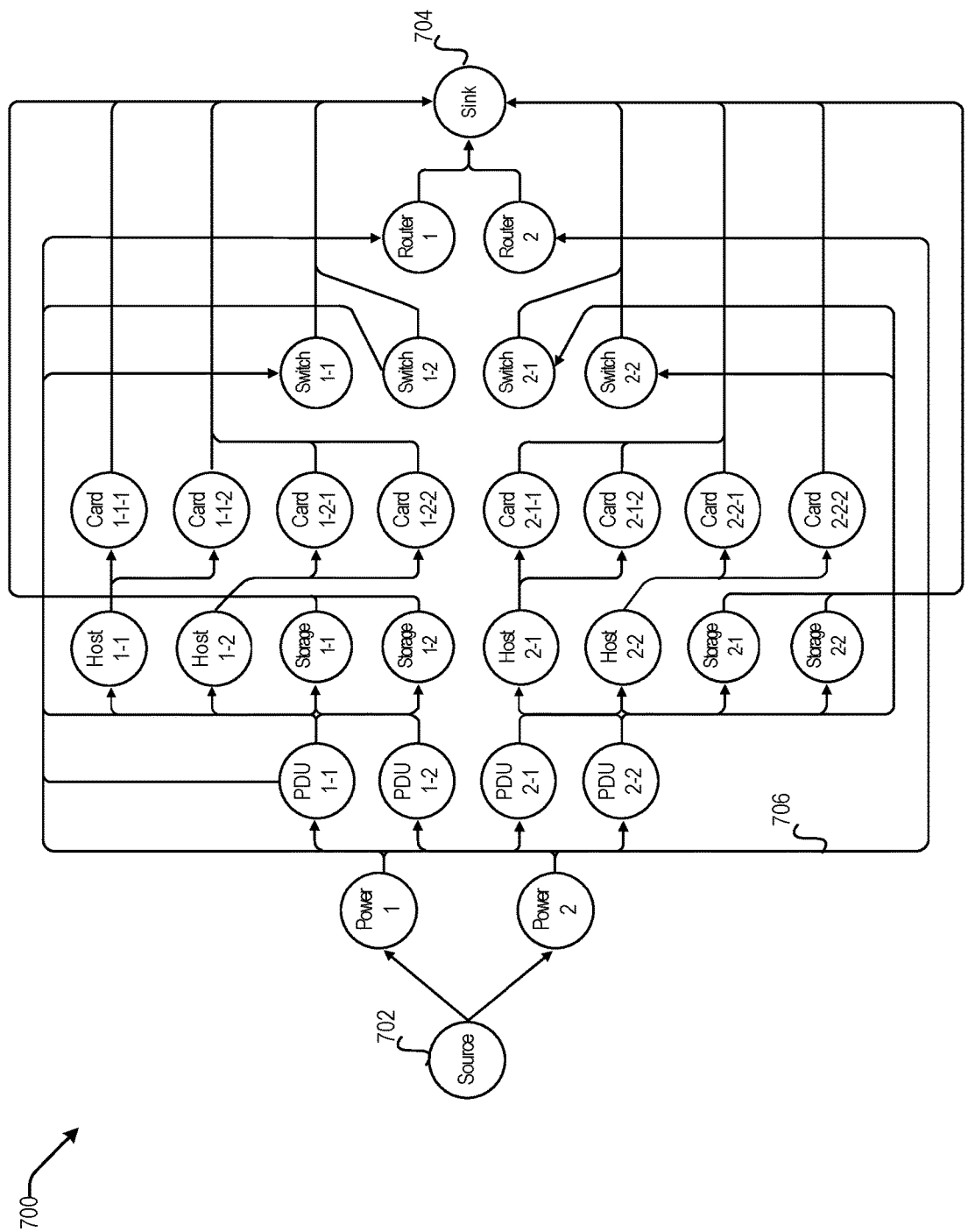
FIG. 7 is an illustration of a power resource graph representing a data center, in accordance with certain embodiments.

FIG. 7 is an illustration of a power resource graph 700 representing a data center, in accordance with certain embodiments. In a certain implementation, the graph generation subsystem 124 generates a power resource graph 700 based on configuration information associated with a data center (e.g., the data center set up 200 as shown FIG. 2). The power resource graph 700 is a logical representation, in graph form, of a set of infrastructure resources (e.g., power supplies, PDUs, hosts, network cards, switches and routers) deployed in the data center and a set of edges representing the power connections between the infrastructure resources. In contrast to the resource graph 500 shown in FIG. 5 and the network resource graph 600 shown in FIG. 6, the set of edges in the power resource graph 700 comprise only a set of power edges representing a set of power connections within the data center. As further illustrated in FIG. 7, the power resource graph 700 additionally includes a source node 702 and a sink node 704 which are created and added by the graph generation subsystem 124 during the process of graph generation as described in FIG. 4. In the illustrated embodiment, the power connectivity between the data center nodes is shown in dotted lines (e.g., 706).

Figure 8:
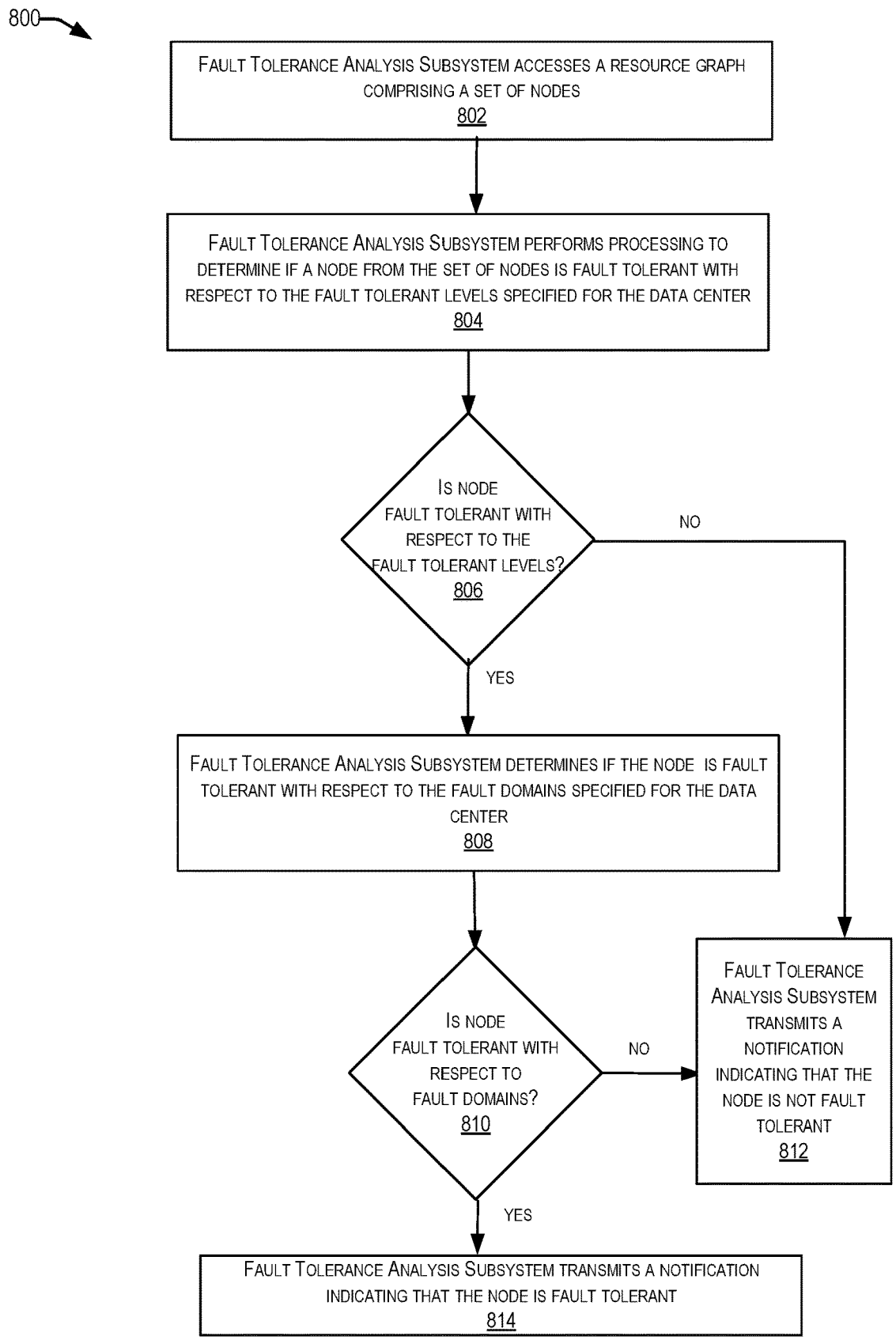
FIG. 8 depicts an example of the processing performed for determining if an infrastructure resource deployed in a data center is fault tolerant with respect to fault tolerance levels and fault domains specified for a data center and initiating one or more responsive actions based on the determining, according to certain embodiments.

FIG. 8 depicts an example of the processing performed for determining if an infrastructure resource deployed in a data center is fault tolerant with respect to fault tolerance levels and fault domains specified for a data center and initiating one or more responsive actions based on the determining, according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 800 presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, the processing in blocks 802-814 may be performed by the fault tolerance analysis subsystem 132, in accordance with certain embodiments.

In certain embodiments, the processing in FIG. 8 is initiated at block 802 when the fault tolerance analysis subsystem 132 accesses a resource graph (e.g., the resource graph 500, 600 or 700 described in FIG. 5, FIG. 6 and FIG. 7 respectively) comprising a set of nodes, representing computing resources in the data center and a set of edges connecting the set of nodes.

The fault tolerance analysis subsystem 132 then performs the processing depicted in blocks 804-814 for each node in the resource graph accessed in block 802 to determine if the node is fault tolerant with respect to the fault tolerance levels and the fault domains specified for the data center. The fault tolerance levels and the fault domains for a data center are numeric values that may be specified, for e.g., by an administrator of the data center at the time of setting up the data center. A data center can have various degrees or levels of fault tolerance. For instance, in one example, a data center may be configured to have a minimum fault tolerance level of two. This indicates that most (if not all) of the infrastructure resources in the data center are duplicated. A fault domain is a set of infrastructure resources in a data center that share a single point of failure. For instance, if a data center consists of two racks, for the data center to be fault tolerant at the rack level, the infrastructure resources (e.g., servers) in the rack should be distributed across at least 2 racks and the number of fault domains specified for the data center, in this case, is 2.

In a certain implementation, to order to perform fault tolerance validation for a node in the resource graph, as a first step, in block 804, the fault tolerance analysis subsystem 132 determines if the node (representing an infrastructure resource in the data center) is fault tolerant with respect to the fault tolerance levels specified for the data center. The processing in block 804 involves, computing, by the fault tolerance analysis subsystem 132, a set of unique paths that connect the node from the source node to the sink node in the resource graph. In one implementation, the path finder component 134 in the fault tolerance analysis subsystem 132 performs the processing in block 802. For instance, based on the power resource graph 700 shown in FIG. 7, for a particular infrastructure resource (e.g., storage node 2-2), the set of unique paths computed for the storage node 2-2 that connect the storage 2-2 node from the source node to the sink node are as shown below:

(1) Source→Power 1→PDU 2-1→Storage 2-2→Sink
(2) Source→Power 2→PDU 2-2→Storage 2-2→Sink At block 806, the fault tolerance analysis subsystem 132 determines if the set of unique paths determined for the identified node in block 804 is greater than or at least equal to the fault tolerance levels specified for the data center. For instance, if the fault tolerance levels specified for the data center is 2, the set of unique paths that connect the node from the source node to the sink node should be at least equal to 2, for the node to be fault tolerant with respect to the fault tolerance levels specified for the data center.

For instance, for the example of the storage node 2-2 shown above, the set of unique paths determined for the storage 2-2 node demonstrates that the storage 2-2 vertex can handle at least one of the power sources (Power 1 or Power 2) to die before critical failure occurs. This indicates that the storage node is fault tolerant and meets the fault tolerance levels (i.e., 2) specified for the data center.

As another example, based on the network resource graph 600 shown in FIG. 6, for a particular infrastructure resource (e.g., host node 1-1), the set of unique paths that connect the host node 1-1 from the source node to the sink node computed by the path finder component 134 in the fault tolerance analysis subsystem 132 are as shown below:

(1) Source→Host 1-1→Card 1-1-1→Switch 1-1→Router 1→Internet 1→Sink
(2) Source→Host 1-1→Card 1-1-2→Switch 1-2→Router 2→Internet 2→Sink The set of unique paths determined for the host node 1-1 shown above demonstrates that the host node is fault tolerant because it can handle at least one of a switch node failure, a network card failure or a router failure before critical failure occurs.

However, if the set of unique paths determined for the node is not greater or equal to the fault tolerance levels (i.e., the set of unique paths through a node are completely identical and the count of the unique paths for the node is thus 1), at block 812, the notifier component 136 in the fault tolerance analysis subsystem 132 transmits a notification indicating that the node is not fault tolerant with respect to the fault tolerant levels specified for the data center and the processing performed by the fault tolerance analysis subsystem 132 for the node ends here.

In certain embodiments, if the fault tolerance analysis subsystem 132 determines that the node is fault tolerant with respect to the fault tolerant levels (as a result of the processing performed in block 806), the fault tolerance analysis subsystem 132 performs an additional check at block 808 to determine if the node is fault tolerant with respect to the number of fault domains specified in the data center. In certain examples, the processing performed in block 808 involves, comparing, by the fault tolerance analysis subsystem 132, the number of unique paths determined for the node in block 806 to the number of fault domains specified for the data center. If the number of unique paths determined for the node is at least equal to or greater than the number of fault domains, then at block 814, the notifier component 136 in the fault tolerance analysis subsystem 132 transmits a notification indicating that the node is fault tolerant with respect to both the fault tolerant levels and the fault domains specified for the data center. For instance, if a data center is deemed to have two fault domains, in order for the node to be fault tolerant with respect to the fault tolerance levels and the fault domains, the set of unique paths computed for the node in block 804 should be more than 1 and the number of unique paths through the graph for the node should be greater than or equal to the number of fault domains specified for the data center.

If the condition in block 810 is not met, then the node is deemed to be not fault tolerant and at block 812, the notifier component 136 in the fault tolerance analysis subsystem 132 transmits a notification indicating that the node is not fault tolerant with respect to the number of fault domains specified for the data center.

The following pseudo-code demonstrates the processing performed by the resource graph generation subsystem 124 and fault tolerance analysis subsystem 132 to build a resource graph and analyze the graph to determine if a node is fault tolerant with respect to the fault tolerance levels and fault domain specified for the data center.

Fault Tolerance Pseudo Code

```
def verifyPowerFaultTolerance(resources: List, faultDomains: int) ->
bool:
    # Build the graph from a set of resources.
    Graph = buildGraph(resources)
    # Get the starting nodes for our path finding.
    Sources = getSourceNodes(graph)
    # Get the shared sink(s) for our graph.
    Sinks = getSinkNodes(graph)
    # Derive the paths from our graph.
    Paths = graph.deriveAllShortestPaths(sources, sinks)
    totalPaths = 0
    # This results in a pairwise comparison
    for a, b in itertools. combinations(paths[r], 2):
        # Because this is an exhaustive combination,
        # we will compare a path against itself.
        # when this case happens, we want to ignore it,
        # if we don't then we will get a false positive.
        If a == b:
            continue
        # If the sets are identical, then we
        # don't have a fault tolerant system.
        If a - b is not None:
            totalPaths += 1
    if totalPaths < faultDomains:
        return False
    return True
```

In the pseudo-code shown above, in a certain implementation, the function buildGraph(resources) may be implemented by the resource graph generation subsystem 124 to build a resource graph, which may include, for instance, a resource graph 500, a network resource graph 600 or a power resource graph 700 shown in FIGS. 5, 6 and 7 respectively. The function graph.deriveAllShortestPaths (sources, sinks) may be implemented by the path finder 134 component in the fault tolerance analysis subsystem 132 to compute the set of unique paths through a node, the "totalPaths" parameter is used to determine the count of the unique paths and the "faultDomains" parameter represents the number of fault domains specified for the data center.

The fault tolerance determination system disclosed herein includes capabilities to determine if the physical infrastructure deployment of a data center meets the fault tolerance levels and fault domains specified for a data center. By determining that the set of infrastructure nodes deployed in a data center are fault tolerant, the system disclosed herein facilitates the correctness of infrastructure planning and implementation of the data center. This, in turn, enables customers utilizing the services of the data center to be rest assured that the physical infrastructure deployment of their data center is robust and resilient.

In certain embodiments, the fault tolerance determination functionality of the data center fault tolerance determination system 102 may be provided as a service by an Infrastructure-as-a-Service (IaaS) provider. The following section describes an example IaaS infrastructure that may be used to implement the service.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
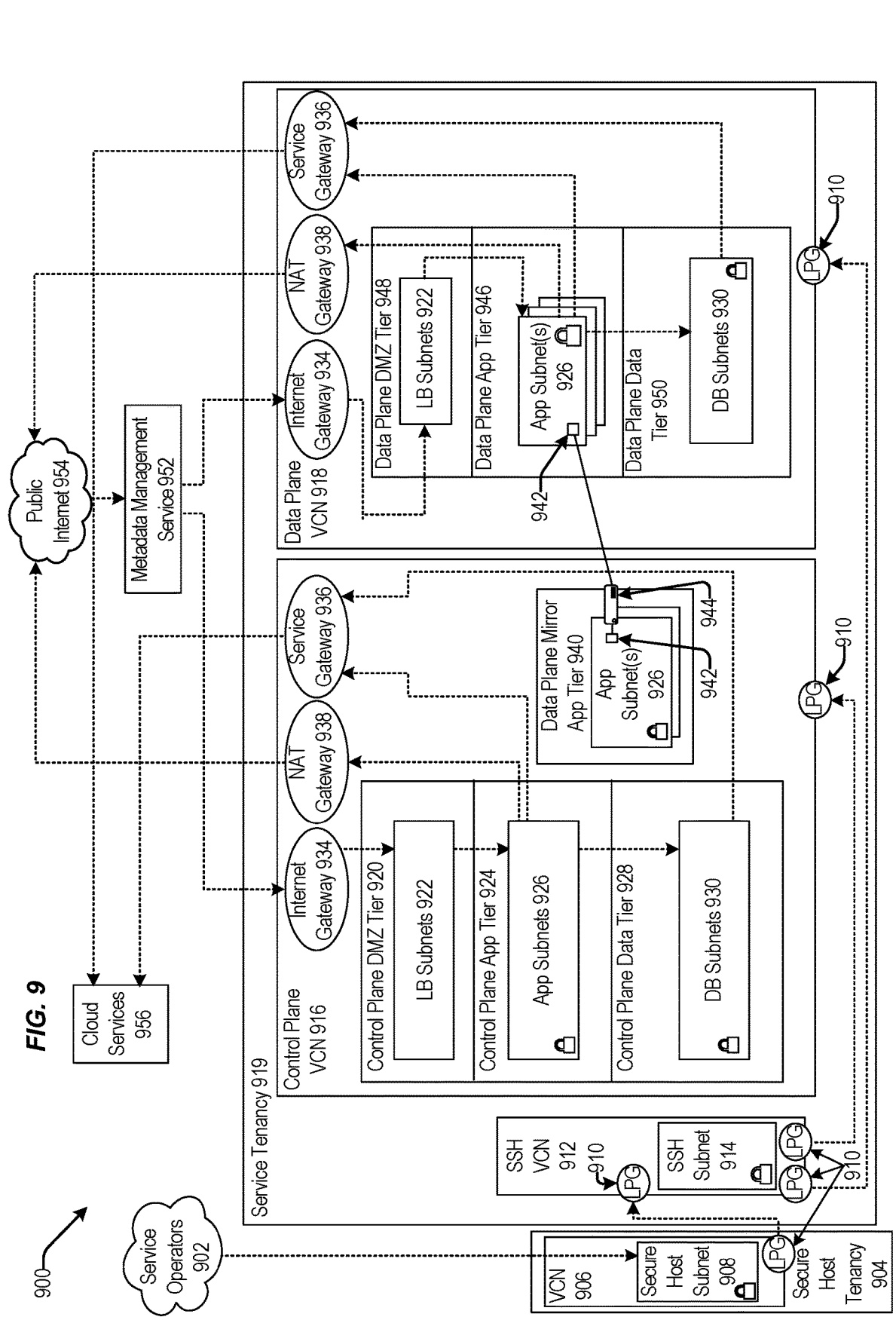
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
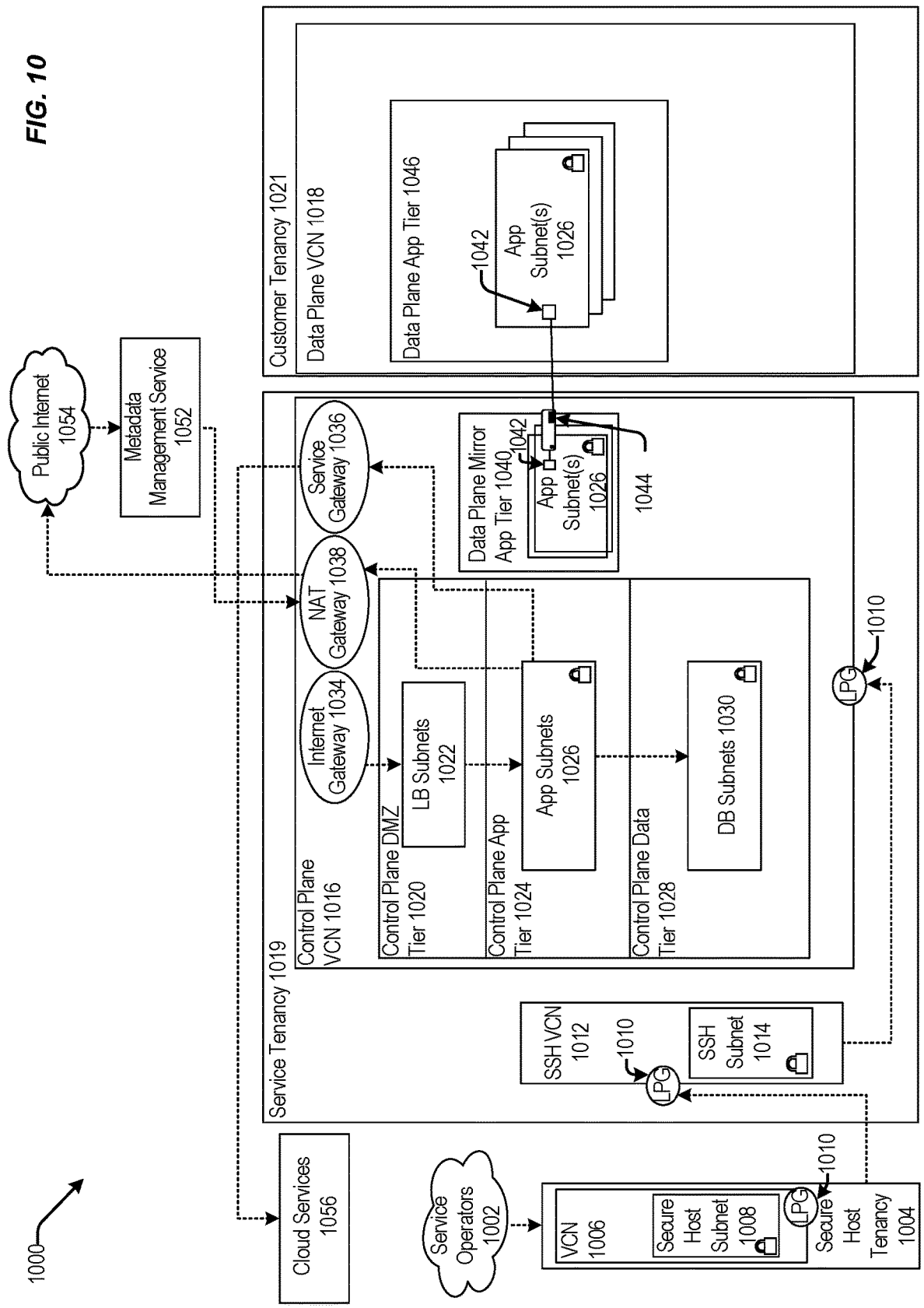
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
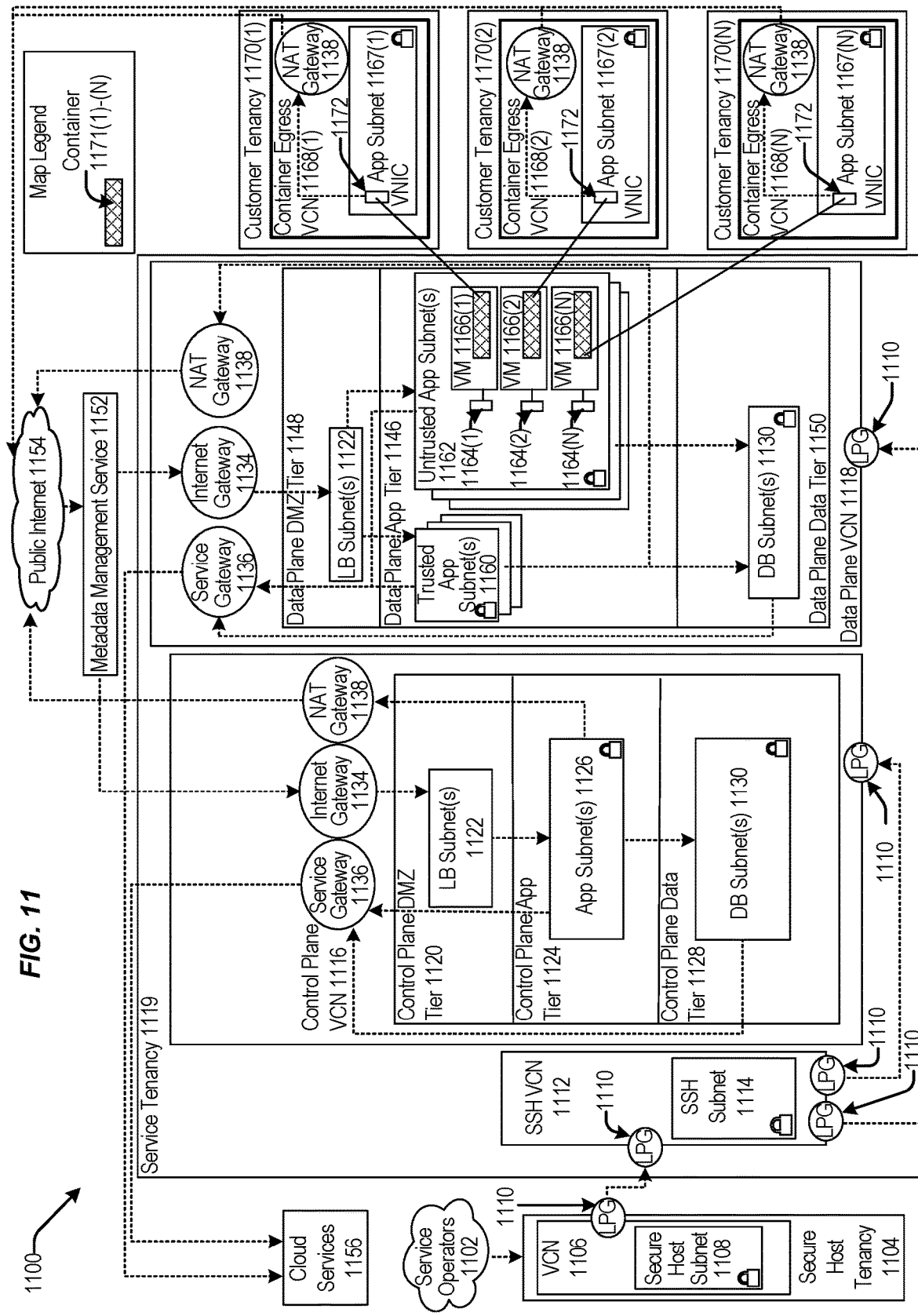
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
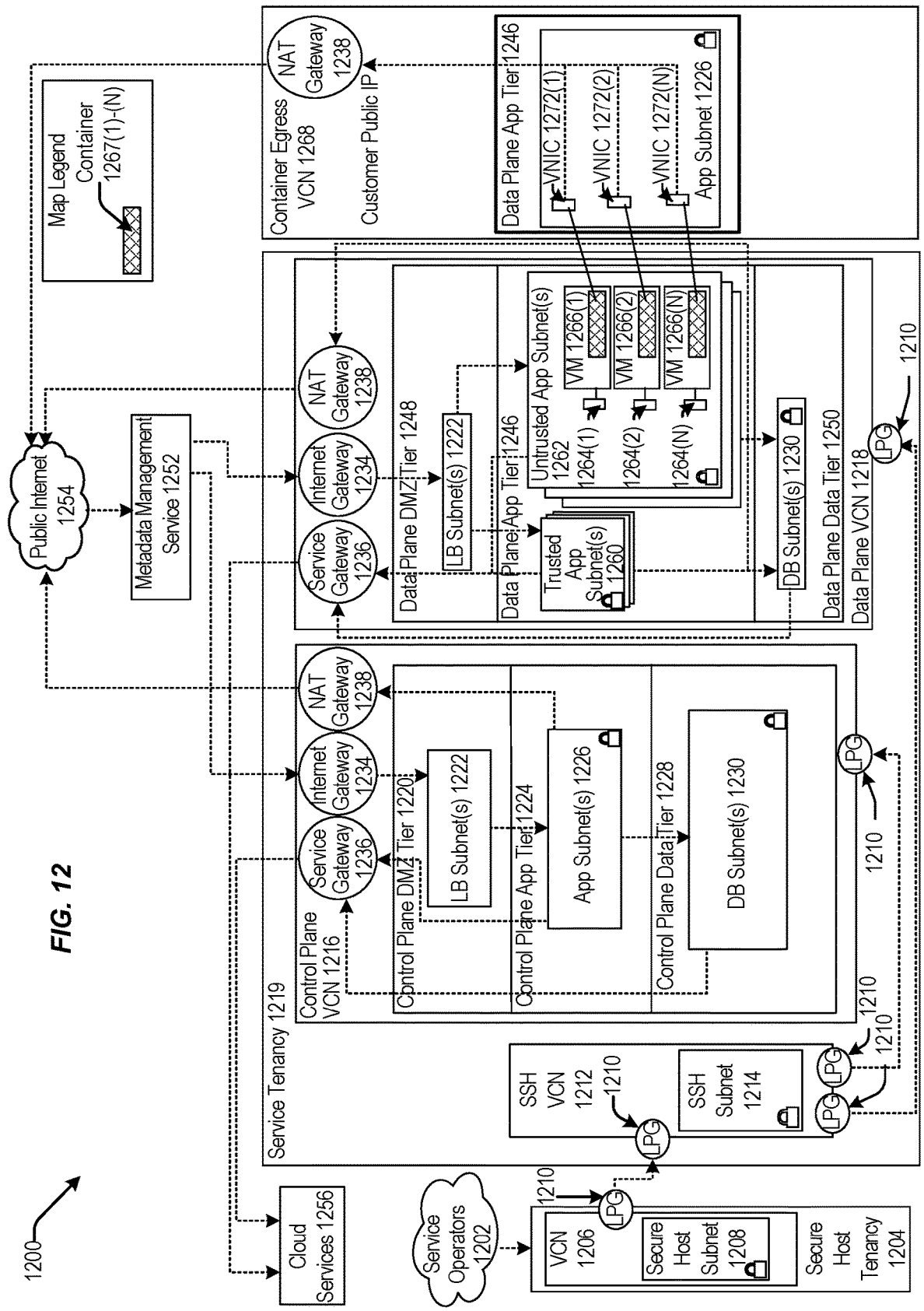
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
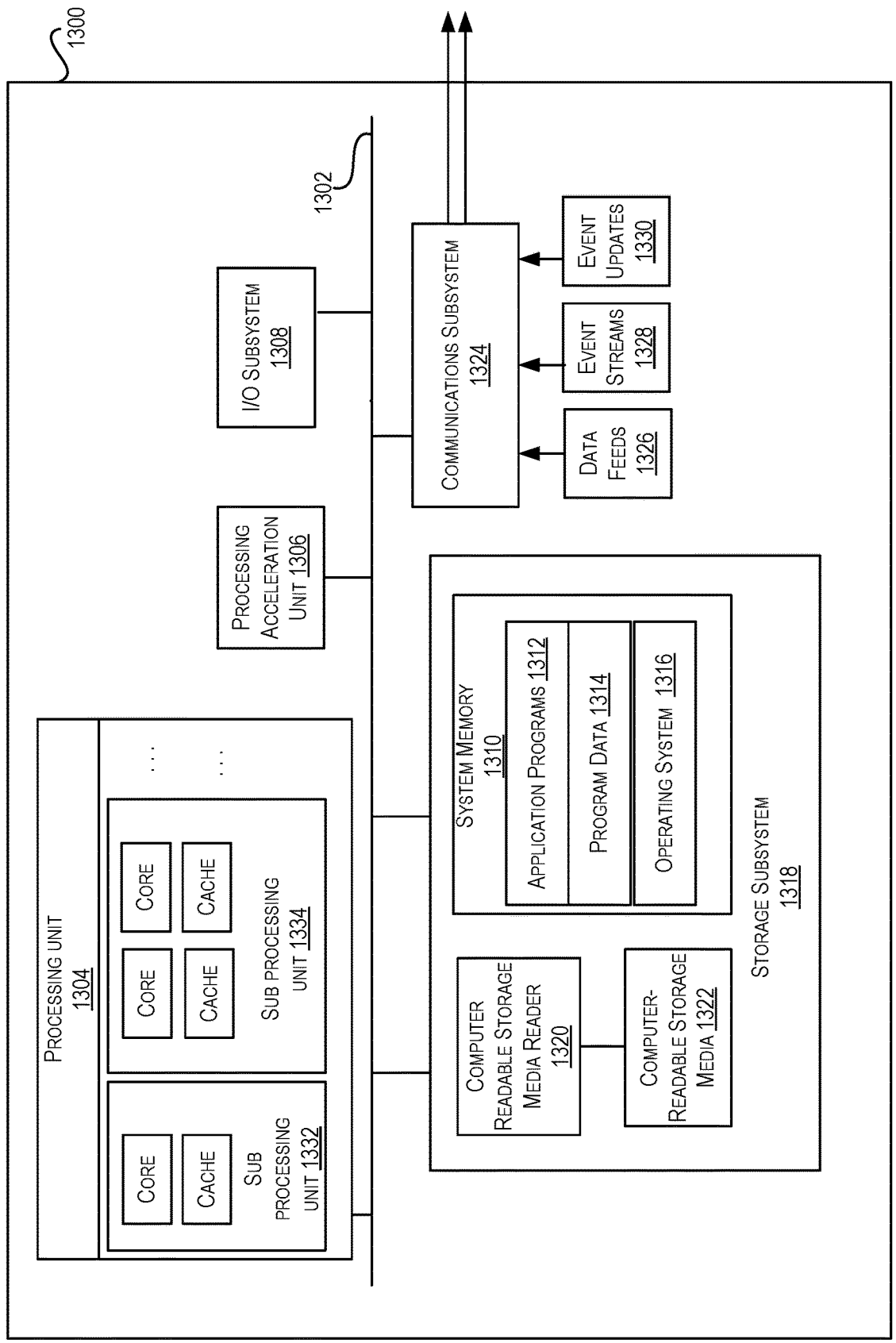
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, by a computing device, configuration information associated with a data center;
   constructing, by the computing device, a resource graph for the data center based at least in part on the configuration information, the resource graph comprising a set of nodes representing a set of infrastructure resources deployed in the data center and a set of edges representing a set of connections between the set of infrastructure resources deployed in the data center;
   for each node in the set of nodes in the resource graph, determining, by the computing device, whether the node representing an infrastructure resource in the set of infrastructure resources deployed in the data center is fault tolerant; and
   in accordance with a determination that the node is fault tolerant, transmitting, by the computing device, a notification that indicates that the node representing the infrastructure resource in the data center is fault tolerant.

2. The computer-implemented method of claim 1, further comprising:
   computing, by the computing device, a set of one or more unique paths connecting the node from a source node to a sink node in the resource graph; and
   based at least in part on the computing, determining, by the computing device, that the node is fault tolerant with respect to fault tolerance levels specified for the data center.

3. The computer-implemented method of claim 2, further comprising:
   determining, by the computing device, that the set of one or more unique paths computed for the node is at least equal to or greater than a number of fault domains specified for the data center; and
   based at least in part on determining that the set of one or more unique paths computed for the node is at least equal to or greater than the number of fault domains specified for the data center, determining, by the computing device, that the node is fault tolerant with respect to the fault tolerance levels and the number of fault domains specified for the data center.

4. The computer-implemented method of claim 3, wherein the notification indicates that the node representing the infrastructure resource in the data center is fault tolerant with respect to both the fault tolerance levels and the number of fault domains specified for the data center.

5. The computer-implemented method of claim 1, further comprising:
   determining, by the computing device, that the node representing the infrastructure resource deployed in the data center is not fault tolerant with respect to fault tolerance levels specified for the data center; and
   responsive to the determining, transmitting, by the computing device, the notification, wherein the notification indicates that the node representing the infrastructure resource in the data center is not fault tolerant with respect to the fault tolerance levels specified for the data center.

6. The computer-implemented method of claim 1, further comprising:
   determining, by the computing device, that the node representing the infrastructure resource deployed in the data center is not fault tolerant with respect to a number of fault domains specified for the data center; and
   responsive to the determining, transmitting, by the computing device, the notification, wherein the notification indicates that the node representing the infrastructure resource in the data center is not fault tolerant with respect to the number of fault domains specified for the data center.

7. The computer-implemented method of claim 1, wherein the configuration information identifies the set of infrastructure resources deployed in the data center and the set of connections between the set of infrastructure resources.

8. The computer-implemented method of claim 7, wherein the set of infrastructure resources deployed in the data center comprise servers, racks, switches, power supplies, and routers deployed in the data center.

9. The computer-implemented method of claim 1, wherein the set of edges in the resource graph represent a set of network edges identifying a set of network connections between the set of infrastructure resources in the data center and a set of power edges identifying a set of power connections between the set of infrastructure resources in the data center.

10. The computer-implemented method of claim 1, further comprising constructing, by the computing device, a network resource graph for the data center based on the configuration information, wherein the network resource graph comprises the set of infrastructure resources deployed in the data center and wherein a set of edges in the network resource graph represent a set of network connections between the set of infrastructure resources.

11. The computer-implemented method of claim 1, further comprising constructing, by the computing device, a power resource graph for the data center based on the configuration information, wherein the power resource graph comprises the set of infrastructure resources and wherein a set of edges in the power resource graph represent a set of power connections between the set of infrastructure resources.

12. A fault tolerance determination system comprising:
a memory; and
one or more processors configured to perform processing, the processing comprising:
receiving configuration information associated with a data center;
constructing a resource graph for the data center based at least in part on the configuration information, the resource graph comprising a set of nodes representing a set of infrastructure resources deployed in the data center and a set of edges representing a set of connections between the set of infrastructure resources deployed in the data center;
for each node in the set of nodes in the resource graph, determining whether the node representing an infrastructure resource in the set of infrastructure resources deployed in the data center is fault tolerant; and
in accordance with a determination that the node is fault tolerant, transmitting a notification that indicates that the node representing the infrastructure resource in the data center is fault tolerant.

13. The system of claim 12, wherein the processing further comprises:
computing a set of one or more unique paths connecting the node from a source node to a sink node in the resource graph; and
based at least in part on the computing, determining that the node is fault tolerant with respect to fault tolerance levels specified for the data center.

14. The system of claim 13, wherein the processing further comprises:
determining that the set of one or more unique paths computed for the node is at least equal to or greater than a number of fault domains specified for the data center; and
based at least in part on determining that the set of one or more unique paths computed for the node is at least equal to or greater than the number of fault domains specified for the data center, determining that the node is fault tolerant with respect to the fault tolerance levels and the fault domains specified for the data center.

15. The system of claim 14, wherein the notification indicates that the node representing the infrastructure resource in the data center is fault tolerant with respect to both the fault tolerance levels and the number of fault domains specified for the data center.

16. The system of claim 12, wherein the configuration information identifies the set of infrastructure resources deployed in the data center and the set of connections between the set of infrastructure resources.

17. The system of claim 12, wherein the set of edges in the resource graph represent a set of network edges identifying a set of network connections between the set of infrastructure resources in the data center and a set of power edges identifying a set of power connections between the set of infrastructure resources in the data center.

18. A non-transitory computer-readable medium storing instructions executable by a computer system that, when executed by one or more processors of the computer system, cause the one or more processors to perform operations comprising:
receiving configuration information associated with a data center;
constructing a resource graph for the data center based at least in part on the configuration information, the resource graph comprising a set of nodes representing a set of infrastructure resources deployed in the data center and a set of edges representing a set of connections between the set of infrastructure resources deployed in the data center;
for each node in the set of nodes in the resource graph, determining whether the node representing an infrastructure resource in the set of infrastructure resources deployed in the data center is fault tolerant; and
in accordance with a determination that the node is fault tolerant, transmitting a notification that indicates that the node representing the infrastructure resource in the data center is fault tolerant.

19. The non-transitory computer-readable medium of claim 18, wherein the operations performed by the one or more processors further comprise: constructing a network resource graph for the data center based on the configuration information, wherein the network resource graph comprises the set of infrastructure resources deployed in the data center and wherein a set of edges in the network resource graph represent a set of network connections between the set of infrastructure resources.

20. The non-transitory computer-readable medium of claim 19, wherein configuration information identifies the set of infrastructure resources deployed in the data center and the set of connections between the set of infrastructure resources.

* * * * *